(12) United States Patent
Traskos et al.

(10) Patent No.: US 6,356,414 B1
(45) Date of Patent: Mar. 12, 2002

(54) LIQUID CRYSTAL POLYMER DISK DRIVE SUSPENSION ASSEMBLY

(75) Inventors: Richard T. Traskos, Brooklyn; Bruce G. Kosa, Woodstock; Michael E. St. Lawrence, Thompson, all of CT (US)

(73) Assignee: World Properties, Inc., Lincolnwood, IL (US)

( * ) Notice: Subject to any disclaimer, the term of this patent is extended or adjusted under 35 U.S.C. 154(b) by 0 days.

(21) Appl. No.: 09/413,221

(22) Filed: Oct. 5, 1999

Related U.S. Application Data

(60) Provisional application No. 60/105,212, filed on Oct. 22, 1998.

(51) Int. Cl.$^7$ ............................................... G11B 5/48
(52) U.S. Cl. .................................. 360/244.3; 360/245.9
(58) Field of Search ............................ 360/244.3, 245.9

(56) References Cited

U.S. PATENT DOCUMENTS

| | | |
|---|---|---|
| 4,543,295 A | 9/1985 | St. Clair et al. |
| 4,991,045 A * | 2/1991 | Oberg |
| 5,142,390 A | 8/1992 | Kimura et al. |
| 5,145,553 A | 9/1992 | Albrechta et al. |
| 5,427,848 A | 6/1995 | Baer et al. |
| 5,443,753 A | 8/1995 | Adler et al. |
| 5,610,785 A | 3/1997 | Aoyagi et al. |
| 5,627,704 A | 5/1997 | Lederman et al. |
| 5,666,241 A | 9/1997 | Summers |
| 5,668,684 A | 9/1997 | Palmer et al. |
| 5,712,749 A | 1/1998 | Gustafson |
| 5,731,401 A | 3/1998 | Bylicki et al. |
| 5,748,409 A | 5/1998 | Girard et al. |
| 5,754,370 A | 5/1998 | Tsuhiya et al. |
| 5,771,135 A | 6/1998 | Ruiz et al. |
| 6,046,886 A | 4/2000 | Himes et al. |

FOREIGN PATENT DOCUMENTS

| | | |
|---|---|---|
| EP | 172012 A | 2/1986 |
| EP | 323008 A | 7/1989 |
| EP | 206600 B | 1/1991 |
| EP | 178836 B | 4/1991 |
| GB | 2227855 A | 8/1990 |
| JP | 62177082 A | 8/1987 |
| JP | 1031835 A | 2/1989 |
| JP | 1261420 A | 10/1989 |
| JP | 1281915 A | 11/1989 |
| JP | 2136292 A | 5/1990 |
| JP | 4293786 A | 10/1992 |
| JP | 4293787 A | 10/1992 |
| JP | 5125258 A | 5/1993 |
| JP | 8113719 A | 5/1996 |
| JP | Hei 8-180353 | 7/1996 |
| JP | 9124771 A | 5/1997 |
| WO | WO 9000674 A | 1/1990 |
| WO | WO 9205953 A | 4/1992 |
| WO | WO 9801511 A | 1/1998 |
| WO | WO 9809319 A | 3/1998 |

* cited by examiner

*Primary Examiner*—Craig A. Renner
(74) *Attorney, Agent, or Firm*—Cantor Colburn LLP

(57) ABSTRACT

The present invention is a liquid crystal polymer suspension assembly. This assembly comprises a stainless steel layer and an electrically conductive layer with a dielectric liquid crystal polymer layer disposed therebetween and bonded thereto. Due to controlled coefficient of thermal expansion, modulus, and very low moisture absorption of the liquid crystal polymer, the suspension assembly of the present invention will have improved dimensional and hygrothermal properties over conventional assemblies, enabling higher density, higher performance assemblies to be produced.

12 Claims, 3 Drawing Sheets

LIQUID CRYSTAL POLYMER DISK DRIVE SUSPENSION ASSEMBLY

CROSS-REFERENCE TO RELATED APPLICATIONS

This application claims the benefit of the filing date of U.S. Provisional Application Ser. No. 60/105,212 filed Oct. 22, 1998, the entire contents of which is hereby incorporated by reference.

TECHNICAL FIELD

The present invention relates to disk drive suspension assemblies, and especially relates to liquid crystal polymer disk drive suspension assemblies.

BACKGROUND OF THE INVENTION

Disk drive suspension assemblies provide flexible support for electronic devices in order to support an electrical connection between a magnetic head and disk drive such as those used in computer equipment. Essentially, the suspension assembly is a very precise metal spring with connecting circuitry that holds recording heads at microscopic distances away from a disk in a rotatable storage device, i.e. a disk drive. The suspension is critical to the operation of the device. The assembly, which has been increasingly important in attaining better device performance, including greater data storage capacity, faster access to data, and increasing reliability, enables the magnetic head to be located close to the device without damaging the head as a result of contact with the rotating device.

One conventional disk drive suspension assembly includes a stainless steel foil member for providing spring action, a layer of polymeric, dielectric material (typically polyimide) thereon with the appropriate circuit pads and circuit lines located on the polymeric material.

U.S. Pat. No. 5,145,5 53 to Albrechta et al., discloses a disk drive suspension assembly having a stainless steel base member, a dielectric layer (polyimide) on the base member and a conductive circuit (copper) on the dielectric layer. The copper-containing circuitry and stainless steel base member are simultaneously etched using a cupric chloride etchant solution to effectively remove desired portions of these metallic materials and produce the desired flexible circuit member. Although this disk drive suspension assembly is particularly useful in the computer industry, its sensitivity to atmospheric changes, such as temperature and relative humidity (hygrothermal conditions) reduces computer tolerances, thereby limiting its usefulness under varying conditions.

What is needed in the art is an improved rotatable data storage suspension assembly which is readily produced and possesses improved hygrothermal properties, and electrical performance.

DISCLOSURE OF THE INVENTION

The present invention relates to a liquid crystal polymer disk drive suspension assembly and a method for making the same. The assembly comprises: a support; an electrically conductive layer; and a dielectric liquid crystal polymer material disposed between, in intimate contact with, and adhered to said support and said conductive layer.

The method for making the suspension assembly of the present invention comprises: forming a dielectric liquid crystal polymer film; disposing said liquid crystal polymer film between a support and an electrically conductive layer; and bonding said liquid crystal polymer layer to said electrically conductive layer and said support.

These and other objects, features and advantages of the present invention will be apparent from the following brief description of the drawings, detailed description and appended claims and drawings.

BRIEF DESCRIPTION OF THE DRAWINGS

The present invention will now be described, by way of example only, with reference to the accompanying drawings which are meant to be exemplary, not limiting, and wherein like elements are numbered alike in several Figures, in which.

BEST MODE FOR CARRYING OUT THE INVENTION

Figure 1:
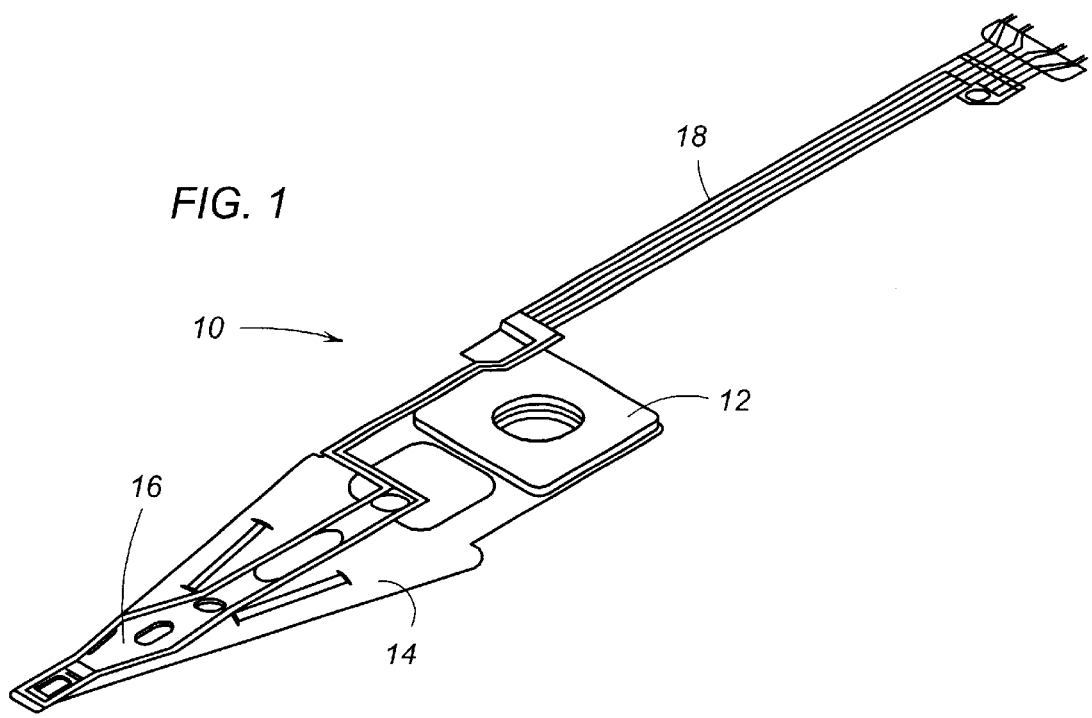
FIG. 1 is an illustration of a disk drive suspension assembly.
Figure 2:
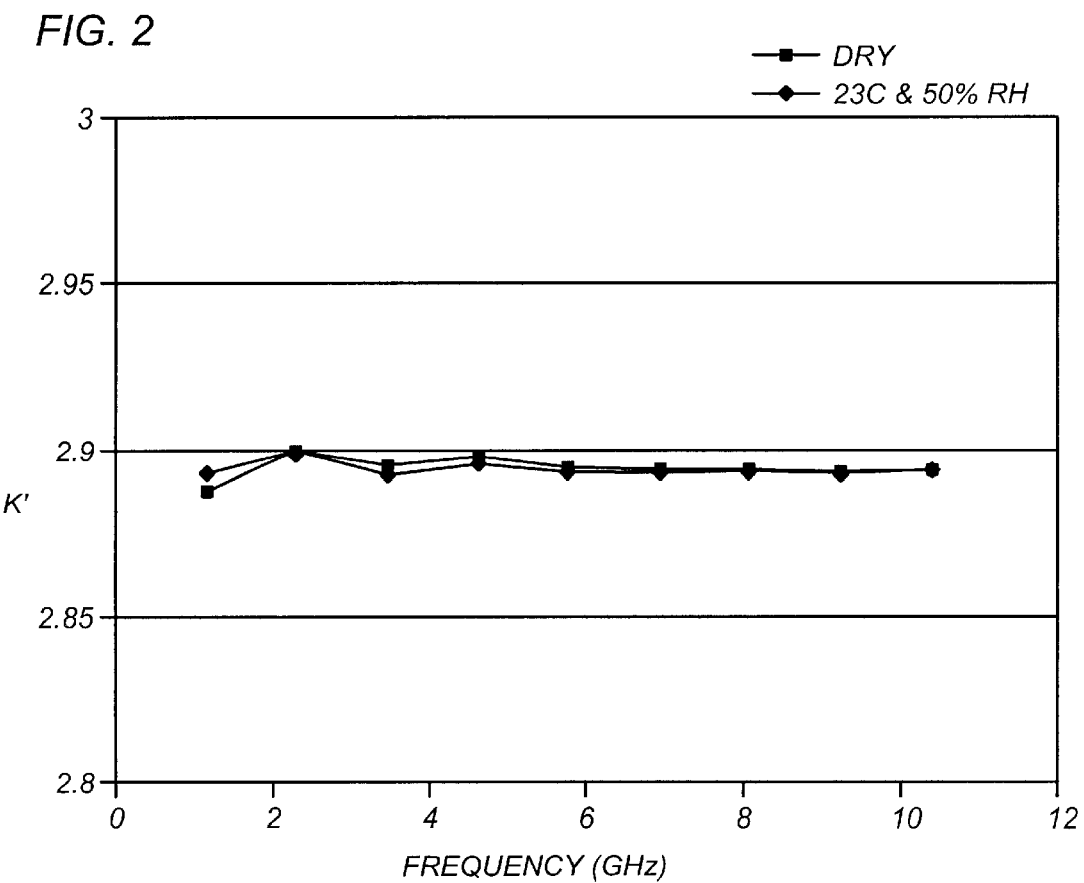
FIGS. 2–5 are graphs illustrating dielectric constant variation based on dry conditions, 50% relative humidity at 23° C., and immersion in water at 50° C., for the liquid crystal polymer assembly of the present invention.
Figure 3:
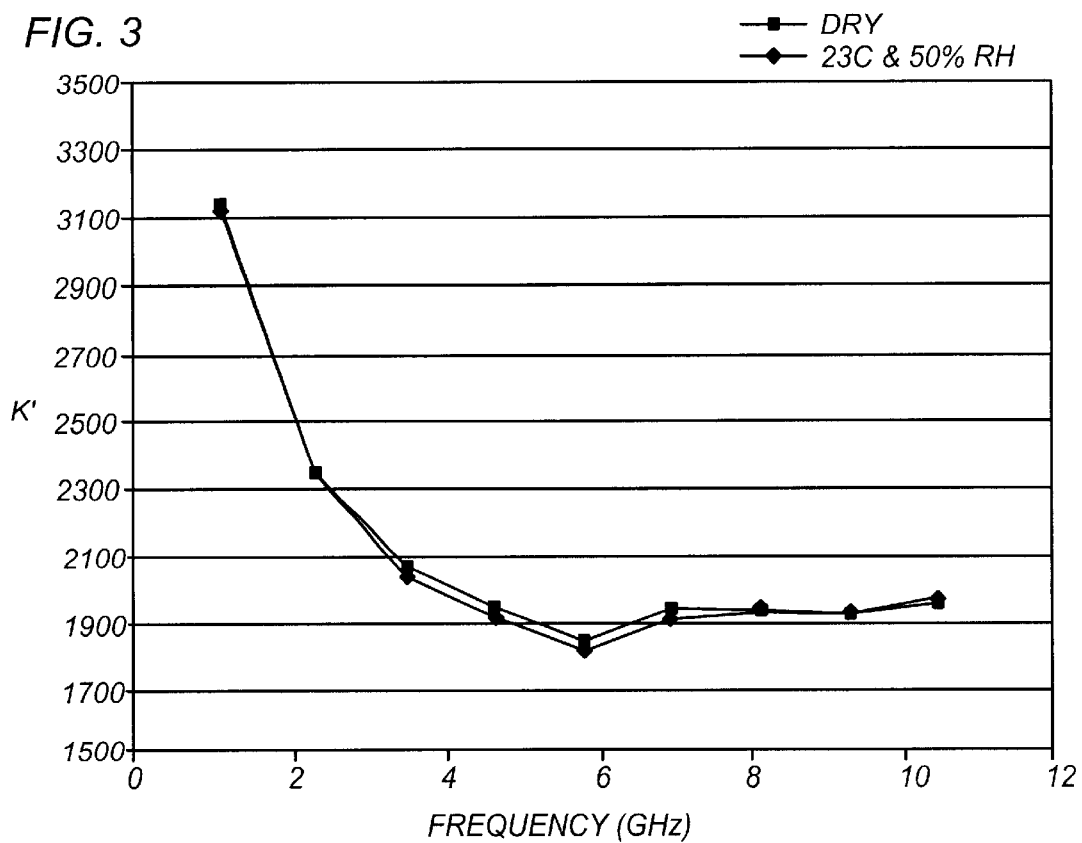

Referring now to FIG. 1, a disk drive suspension assembly 10 is illustrated. The disk drive suspension assembly 10 comprises a flexure 16 having an electrically conductive material (or layer), such as stainless steel or copper, and incorporating a liquid crystal polymer adhered to a flexible support 14. The disk drive suspension assembly 10 also comprises a base plate (or attachment) 12 and a tail 18, which can optionally be part of the flexure 16.

The present invention relates to a rotatable storage device suspension assembly and method for making the same. The assembly comprises a support, an electrically conductive layer and a dielectric liquid crystal polymer layer disposed therebetween. The method comprises forming a liquid crystal polymer film, disposing the liquid crystal polymer film between a support and an electrically conductive layer and laminating, with heat and pressure, the liquid crystal polymer film thereto.

The support provides sufficient stiffness and structural integrity to the assembly while also providing sufficient elasticity. Any conventional suspension assembly support material can be employed which is compatible with the operating environment and preferably has a modulus of elasticity exceeding about $1.5 \times 10^7$ mN/mm$^2$ (milliNewton per square millimeter), a tensile strength exceeding about $1 \times 10^6$ mN/mm$^2$, a yield strength exceeding about $1 \times 10^6$ mN/mm$^2$, and a percent elongation of up to about 10% with up to about 5% preferred, at the desired thickness. Possible supports which include, but are not limited to, beryllium-copper, titanium, copper, zinc, stainless steel, alloys thereof, and others, with stainless steel preferred. These supports may have a corrosion resistant coating. For example, the support can be a commercial grade stainless steel such as A.I.S.I. (American Iron and Steel Institute) 302 grade steel, A.S.T.M. (American Society for Testing of Materials) designations A-167 and A-240 stainless steels, among others known in the art with optional corrosioin resistant coatings comprising principally of chrome, zinc, brass, or another conventional corrosion resistant materials possible. Typically, the support has a thickness of up to about 5.0 mils, with a thickness of less than about 1.5 mil preferred, and a thickness of less than about 1.0 mil especially preferred.

Although the support can be directly coated with a liquid crystal polymer, thru a conventional process such as solution casting or melt extrusion, it is preferred to prepare a separate film of a liquid crystal polymer and then combine it with a support and conductive layer through lamination. Important characteristics of the desired liquid crystal polymer film include: elasticity, sufficient thickness to attain the desired impedance, sufficient thinness not to adversely effect the flexural properties of the support, uniformity of thickness, low dielectric constant (i.e. less than about 4.0), uniformity of dielectric constant, adequate adhesion to the support and the electrically conductive layer, and good hygrothermal properties (i.e. substantially constant dielectric constant, dissipation factor (loss of electrical signal sensitivity across the material), and dimensional change, regardless of temperature and humidity).

Although numerous thermotropic and lyotropic liquid crystal polymer can be used with the present invention, a balanced liquid crystal polymer is preferred due to its multidirectional control of orientation, coefficient of thermal expansion, and modulus (control of stiffness), and low cost. Typical liquid crystal polymer films have mechanical properties which differ in the flow direction from the direction perpendicular thereto. For instance, a typical extruded liquid crystal polymer formed into a film, fiber, or rod, is an order of magnitude or more stronger in the flow direction than in the direction perpendicular thereto, and has a coefficient of thermal expansion which is much lower in the flow direction only. In contrast, a balanced liquid crystal polymer is substantially more uniform in the flow direction and the direction perpendicular thereto. Generally, the balanced liquid crystal polymer has a tensile strength in the flow direction versus perpendicular thereto of less than 10:1, with less than about 5:1 preferred, and about 3:1 or less especially preferred; a coefficient of thermal expansion of less than about 3:1, with less than about 2:1 preferred, and about 1.5:1 or less especially preferred. Possible liquid crystal polymers which can be used with the present invention include, but are not limited to Vectra®, commercially available from Ticona, Xycla®, commercially available from Amoco Polymers, and Zen.Zc®, commercially available from DuPont, among others.

The liquid crystal polymer film can be formed in any conventional manner, such as an extrusion or other process with provisions for making a balanced film. Preferably, blown film extrusion is employed for making a balanced film where a manner of orienting the film, such as counter-rotating extrusion dies with blown film extrusion or T-die extrusion with tentering (bi-axial stretching), is employed.

Sufficient thickness of the liquid crystal polymer film to attain the desired impedance is utilized. Typically an impedance of about 25 to about 75 ohms is employed, with an impedance of about 48 to about 53 ohms preferred. In order to attain such an impedance, and also minimize the dynamic flexural properties of the assembly, the liquid crystal polymer film, which can be a single layer or a series of sublayers, typically has an overall thickness of less than about 2.0 mils, with a thickness of less than about 1.5 mils preferred, and less than 1.0 mil especially preferred.

The electrically conductive layer, which is disposed on the side of the liquid crystal polymer film opposite the support, can be any material capable of functioning as the assembly's circuitry and preferably having a coefficient of thermal expansion similar to that of the support. Typically this layer, which has a sufficient thickness to not restrict current flow while being sufficiently thin to be made into fine circuitry, i.e., generally up to about 2.0 mils thick with about 0.2 to about 0.8 mils preferred, can be a metallic foil such as copper, a copper alloy, and/or other electrically conductive metals and alloys typically used in the circuit industry, including, but not limited to, alloys and mixtures of iron, nickel, silver, aluminum, phosphorous, zinc, manganese, silicone, and others. One example of a copper alloy electrically conductive foil is A.S.T.M. specification number B-465 which comprises about 97.5% copper, 2.35% iron, 0.03% phosphorous, and 0.12% zinc.

Once the electrically conductive layer, dielectric liquid crystal polymer film, and stainless steel layers have been stacked, these layers are preferably laminated together in a conventional manner. Possible laminating methods include, but are not limited to, a lamination press, autoclave, and continuous roll-to-roll lamination, among others, with the preferred method based upon the type of liquid crystal polymer employed (thermosetting or thermoplastic). Furthermore, it is preferred to control the lamination temperature and pressure so as to attain proper flow, adhesion, final mechanical properties. For example, the stack is placed in a laminating press at a low pressure. While under low pressure, the stack is heated to about 300° C. The stack is then compressed to 500 pounds per square inch (psi) for a sufficient period to flow the liquid crystal polymer, wetting the surfaces of the metal layers, and forming a substantially strong and continuous bond between the various layers.

Once laminated, the laminate is prepared for circuitization using conventional processes. For example, the support and electrically conductive layers can be etched using a conventional etching process such as chemical milling, among others. Chemical milling, for example, comprises cleaning the laminate, attaching a photoresist to protect or mask metallic areas of the laminate which are not to be etched, removing the photoresist from the areas which will be etched, and etching the support, and electrically conductive layer. Possible etchants which can be used with the current process include hydrochloric acid, ferric chloride, cupric chloride, among others conventionally known in the art.

Once the support and conductive layers have been etched, the liquid crystal polymer could then have features created in it using plasma, reaction-ion, laser etching, or chemical milling. Features could be through holes or windows for access to the backside of one of the metal or to eliminate material so as to minimize the dielectric's impact on the support's flexural properties. Typical plasma etching is performed under vacuum using oxygen ($O_2$) alone or in combination with blends of other chemicals. Usually, about 3 gases or less are used in combination with the oxygen, although more gases can be employed. Examples of possible gas mixtures include 80 vol % $O_2$, 15 vol % $CF_4$, and 5 vol % $N_2$; and 85 vol % $O_2$ and 15 vol % $NF_3$; among others.

EXAMPLE 1

The following example can be utilized to form the liquid crystal polymer suspension assembly of the present invention having an overall thickness of approximately 2.1 mils (54 microns ($\mu$)); i.e., 18 $\mu$stainless steel, 18 $\mu$liquid crystal polymer, and 18 $\mu$copper.

A 0.7 mil (18 $\mu$) thick thermotropic balanced liquid crystal polymer film (FA-100 from Kuraray Co., Ltd, Osaka, Japan) can be extruded by blown film extrusion.

The liquid crystal polymer film is then disposed between a 0.7 mil (18 $\mu$) thick sheet of A.S.T.M. 302 stainless steel and a 0.7 mil (18 $\mu$) thick A.S.T.M. C 7025 copper alloy foil to form a stack.

The stack can then be laminated in a press (flat bed) lamination process where the stack is placed in the press and compressed to about 100 psi. Once at 100 psi, the stack is heated to a temperature of about 295° C., and then further compressed to a pressure of about 500 psi. The laminate is held at 295° C. and 500 psi for at least 5 minutes prior to being cooled to room temperature and then removed from the press. The lamination process causes the liquid crystal polymer film to melt and adhere to both the stainless steel and copper alloy foil. In preparation for creating a circuit from the laminate, it is first cleaned using conventional techniques.

The cleaned laminate is then coated on both the stainless steel and the copper alloy foil sides, with a photoresist which essentially masks these layers from etchant. The photoresist can be applied to the structure by hot rolling Riston 4106 dry film resist onto the structure and laminating at a temperature of 105° C. and pressure of 30 psi in order to bond the photoresist to the structure.

Areas of the photoresist are then selectively removed to expose the areas of the laminate to be etched. For example, the photoresist layers are exposed to ultraviolet light at about 35 millijoules of energy in order to expose the area where the desired circuit pattern is to be located. The appropriate portions of the photoresist are then removed using conventional means such as an appropriate developing solution.

The exposed photoresist laminate can then be etched using an etching solution comprised, for example, of up to about 75 weight percent (wt %) cupric chloride, up to about 5 wt % hydrochloric acid, and the balance deionized water; of about 39.0 to 44.0 wt % cupric chloride, about 3.20 to 4.00 wt % hydrochloric acid, balance deionized water; or another etching solution conventionally known in the art. The etching can occur at a temperature of about 50° C. for a period of up to about 5 minutes, with less than 1 minute preferred.

Next the liquid crystal polymer dielectric must be selectively removed, another layer of Riston dry film photo resist is applied to both sides of the laminate, exposed to UV light (defining remaining liquid crystal polymer geometry), and then developed. This laminate could then be placed in a high vacuum plasma etcher (under appropriate temperature, pressure, and gas mix conditions) and have the liquid crystal polymer removed.

If protective plating is to be used (such as nickel-gold, or tri-lead) it would then be plated on the desired circuit areas.

EXAMPLE 2

The following example can be used to form a liquid crystal polymer based suspension. An alternate suspension assembly could be made utilizing a liquid crystal polymer flex circuit material. A thin (<4 mils) unreinforced film based material that by nature is flexible. This assembly would consist of a liquid crystal polymer laminate with copper on one side having the circuit traces fabricated using traditional flex circuit processes, then having the entire circuit bonded to a stainless steel support. The magneto-resistive (MR) head would then be attached to the copper circuit in a secondary operation via traditional means.

The stainless steel could be one of a number of grades (such as A.S.T.M. 302) and of the appropriate thickness (about 0.5 to about 2.0 mils) and width for the given geometries and loads. The main function of the stainless steel material is to support the mass of the flex material and magneto-resistive head at the appropriate distance from the rotating storage disk. The liquid crystal polymer laminate could consist of a liquid crystal polymer film material (such as FA-100 from Kuraray) being laminated to rolled copper (such as alloy 110 from Olin). The liquid crystal polymer thickness could range from about 0.4 to about 2.0 mils and the copper could range in thickness from about 0.1 to about 2.0 mils. The preferred thickness is about 0.7 to about 1.0 mils for the liquid crystal polymer, i.e. a thickness sufficient to allow processing in a traditional flex circuit making operation. The preferred copper thickness is about 0.2 to about 0.8, with the thinner copper allowing finer circuit geometries to be fabricated. The liquid crystal polymer flex circuit could then be attached to the stainless steel with an adhesive such as epoxy resin or a single pressure sensitive adhesive (PSA).

The advantage of this approach is that the trace circuitry (those conductive elements etched in the copper foil on the liquid crystal polymer) are created using industry standard flex circuit making techniques. This can be a low cost, high volume process. The advantage of a liquid crystal polymer flex material is that it will provide improved dimensional and electrical performance over a wide range of environmental conditions, thereby improving the device's reliability.

The following table compares a liquid crystal film assembly versus a conventional polyimide film. As can be seen from the table, the liquid crystal polymer material showed substantially improved hygrothermal properties (water absorption of only 0.04 versus 2.90 for the polyimide and coefficient of water absorbing expansion of 4 versus 12 to 22 for the polyimide), improved dielectric properties when exposed to humidity (volume and surface resistivity), and a seventy percent improvement in bending performance. Property Test Method Liquid Crystal Polyimide

| Property | Test Method | Liquid Crystal Polymer (FA-100 Kurray) | Polyimide |
|---|---|---|---|
| Water Absorption (wt %) | 23° C. 24 hrs. | 0.04 | 2.90 |
| CWAE[2] (pm/% RH[3]) | 60° C. | 4 | 12 to 22 |
| Modulus (Kg/mm$^2$)[1] | ASTM D882 | 330 | 300 to 600 |
| Volume Resistance ($10^{15}$ ohms ($\Omega$)) | 20° C. 96 hrs. 65% RH | 7.7 | 1.2 |
| Surface Resistance ($10^{13}$ $\Omega$) | 20° C. 96 hrs. 65% RH | 14 | 1.1 |
| Bending Test (No. cycles) | JIS C5016[4] R = 2.0 mm | 4500 | 2600 |

Figure 4:
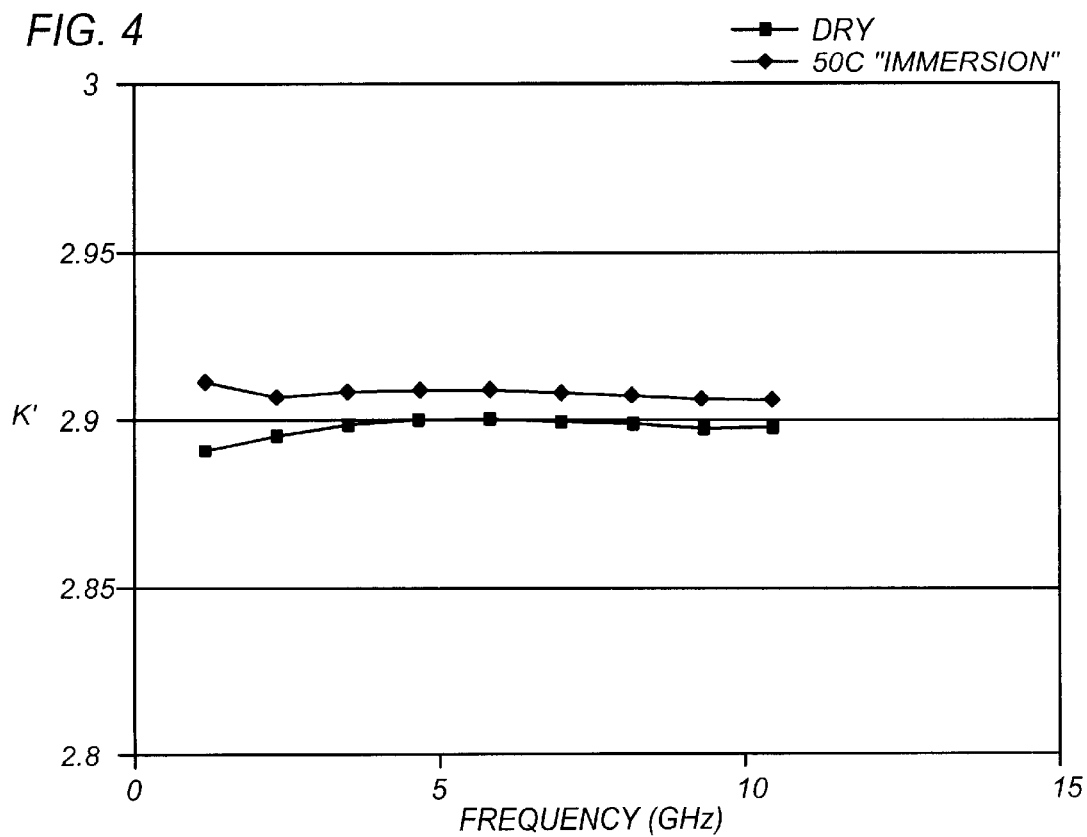
Figure 5:
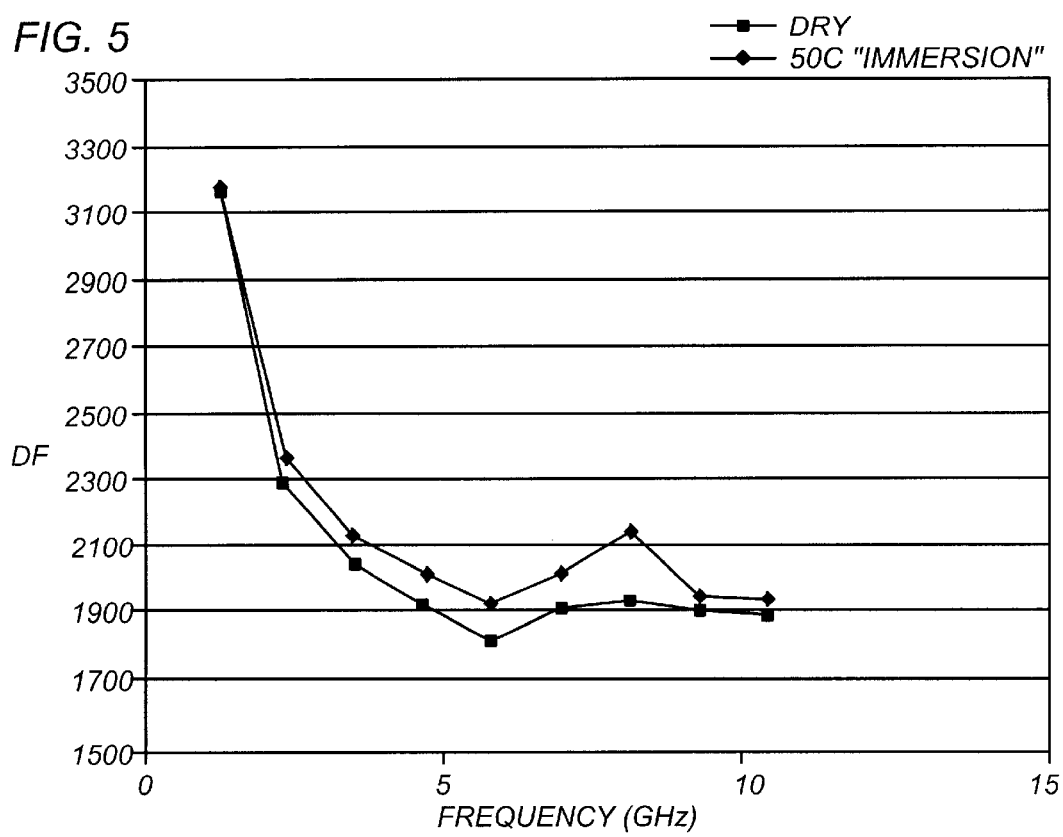
Figure 6:
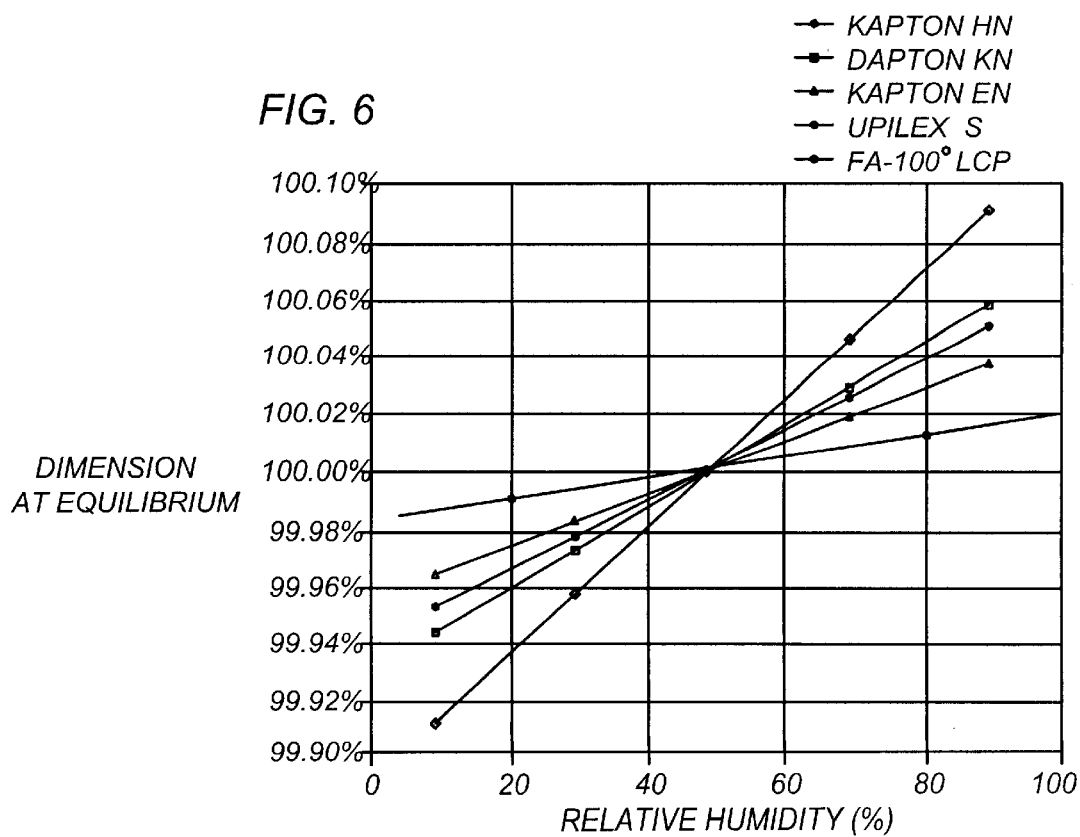
FIG. 6 is a graph of the effect of relative humidity on the dimension at equilibrium of polyimide assemblies.

[1]After lamination
[2]Coefficient of water absorbing expansion
[3]RH is relative humidity
[4]JIS is Japan Industrial Standard In addition to the Table, the hygrothermal stability is further established in FIGS. 2–5 which set forth the liquid crystal polymer assembly dielectric constant versus frequency under dry conditions and under 50% relative humidity at 23° C. (FIGS. 2 and 3), and dielectric constant versus frequency under dry conditions and after immersion in water at 50° C. for 9 days (FIGS. 4 and 5). As is evident from these Figures, the dielectric constant essentially did not vary at 50% relative humidity and only varied slightly after immersion in water for 9 days. In contrast, FIG. 6 shows the dimension at equilibrium versus relative humidity for a polyimide assembly. As is evident from this Figure, the dimension at equilibrium varied significantly with relative humidity.

The rotatable storage device suspension assembly of the present invention possesses a significantly improved resistance to hygrothermal fluctuation compared to conventional polyimide based suspension assemblies, improved dimensional stability due to tailorable coefficient of thermal expansion and low modulus which allows the stainless steel to dominate the laminate modulus, and excellent environmental resistance. Furthermore, when the balanced liquid crystal polymer is employed, the assembly has more uniform properties (compared to unbalanced liquid crystal polymer laminates) improving the ease of manufacture of the circuits themselves.

Compared to conventional suspension assemblies, such as polyimide suspension assemblies, the assembly of the present invention has a low coefficient of hygrothermal expansion (CHE) typically less than about 10 parts per million per percent relative humidity (ppm/% RH), with less than about 5 ppm/% RH preferred, while conventional assemblies have a CHE exceeding about 20 ppm/% RH. Considering that high coefficient of hygrothermal expansion creates flatness problems. Additionally, the assembly of the present invention has a low coefficient of thermal expansion, i.e., about 1.5/1 or less (the flow direction versus the direction perpendicular thereto); and a dielectric constant which is substantially constant with changes in humidity. In contrast, conventional assemblies have coefficient of thermal expansion exceeding 2/1 and typically exceeding 5/1, and the dielectric constant fluctuates with humidity. Consequently, the unique suspension assembly of the present invention is hygrothermally stable, possesses a substantially constant coefficient of thermal expansion in both the flow direction and the direction perpendicular thereto, and has a dielectric constant (DK) which is substantially unaffected by changes in humidity.

It will be understood that a person skilled in the art may make modification to the preferred embodiments shown herewith within the scope and intent of the claims. While the present invention has been described as carried out in a specific embodiment thereof, it is not intended to be limited thereby but is intended to cover the invention broadly within the scope and spirit of the claims.

What is claimed is:

1. A disk drive suspension assembly comprising:
    a flexible support;
    an electrically conductive layer supported by the flexible support; and
    a dielectric liquid crystal polymer material sandwiched between, in intimate contact with, and adhered to said support and said conductive layer.

2. A suspension assembly as in claim 1, wherein said conductive layer includes copper and copper alloys.

3. A suspension assembly as in claim 1, wherein said liquid crystal polymer material is thermotropic.

4. A suspension assembly as in claim 1, wherein said liquid crystal polymer material is a balanced liquid crystal polymer.

5. A suspension assembly as in claim 4, wherein said liquid crystal polymer material has a tensile strength in a machine direction versus a direction perpendicular thereto of less than 10:1.

6. A suspension assembly as in claim 4, wherein said liquid crystal polymer material has a tensile strength in a machine direction versus a direction perpendicular thereto of less than 5:1.

7. A suspension assembly as in claim 4, wherein said liquid crystal polymer material has a tensile strength in a flow direction versus a direction perpendicular thereto of about 3:1 or less.

8. A suspension assembly as in claim 4, wherein said liquid crystal polymer material has a coefficient of hygrothermal expansion of less than about 10 ppm/% RH.

9. A suspension assembly as in claim 4, wherein said liquid crystal polymer material has a coefficient of hygrothermal expansion of less than about 5 ppm/% RH.

10. A suspension assembly as in claim 4, wherein said liquid crystal polymer material has a coefficient of hygrothermal expansion of about 1.5:1 or less in a flow direction versus a direction perpendicular thereto.

11. A suspension assembly as in claim 4, wherein said liquid crystal polymer material has a dielectric constant which is substantially unaffected by changes in humidity.

12. A suspension assembly as in claim 1, wherein said support comprises stainless steel.

* * * * *

UNITED STATES PATENT AND TRADEMARK OFFICE
CERTIFICATE OF CORRECTION

PATENT NO.    : 6,356,414 B1
DATED         : March 12, 2002
INVENTOR(S)   : Traskos et al.

Page 1 of 1

It is certified that error appears in the above-identified patent and that said Letters Patent is hereby corrected as shown below:

Title page,
Item [56], References Cited, U.S. PATENT DOCUMENTS, insert -- 5,426,549 6/1995 Sakai --; and after "5,754,370 A 5/1998" delete "Tsuhiya" and insert therefor
-- Tsuchiya --

Column 2,
Line 34, after "be" insert therefor -- a --

Column 3,
Line 40, before "commercially" delete "Xycla®," and insert therefor -- Xyclar®," --

Column 4,
Line 57, before "steel" delete "$\mu$stainless" and insert therefor-- $\mu$ stainless --
Line 57, before "crystal" delete "$\mu$liquid" and insert therefor -- $\mu$ liquid --
Line 58, after "18" delete "$\mu$copper" and insert therefor -- $\mu$ copper --

Column 6,
Line 31, delete "Property Test Method Liquid Crystal Polyimide"

Signed and Sealed this

Ninth Day of August, 2005

JON W. DUDAS
*Director of the United States Patent and Trademark Office*